United States Patent [19]

Friloux

[11] Patent Number: 5,631,047
[45] Date of Patent: May 20, 1997

[54] COMBINATION FIRE RETARDANT, ANTI-SOILING AND BIOCIDAL AGENT

[75] Inventor: Edward E. Friloux, Broussard, La.

[73] Assignee: American Fire Retardant Corp., Broussard, La.

[21] Appl. No.: 530,691

[22] Filed: Sep. 19, 1995

[51] Int. Cl.$^6$ .................... B05D 1/02; B05D 1/18
[52] U.S. Cl. ............. 427/421; 427/430.1; 427/439; 524/27; 524/80; 524/81; 524/284; 524/462; 526/245
[58] Field of Search .................. 427/385.5, 389.9, 427/393.3, 393.4, 391, 343, 421, 430.1, 439; 428/421, 422, 907; 526/245; 524/27, 80, 81, 284, 462

[56] References Cited

U.S. PATENT DOCUMENTS

| | | | |
|---|---|---|---|
| 4,920,190 | 4/1990 | Lina et al. | 526/245 X |
| 5,216,097 | 6/1993 | Allewaert et al. | 526/245 X |
| 5,418,006 | 5/1995 | Roth et al. | 427/155 X |
| 5,446,118 | 8/1995 | Shen et al. | 526/245 |

*Primary Examiner*—Michael Lusignan
*Attorney, Agent, or Firm*—Jesse D. Lambert

[57] ABSTRACT

This invention relates to a composition suitable for use as a combination fire retardant, soil and water protectant, and biocide, and to the method of making and applying the composition. The preferred embodiment contains the following ingredients: from 2.30% to 9.22% by total weight of ammonium phosphate, monobasic; from 2.30% to 9.22% by total weight of ammonium phosphate, dibasic; from 2.30% to 9.22% by total weight of a compound comprising approximately 50% ammonium polyphosphate, 3% urea, and 47% water; from 2.60% to 10.4% by total weight of a fluorinated acrylic polymer; from 0.025% to 0.1% by total weight of coco imidazuline dicarboxylate; from 1.00% to 4.00% by total weight of organotin; and from 57.84% to 89.475% by total weight of water. The composition is applied to porous materials, such as fabrics, wood, cardboard, or fiberboard, for protection from fire, soil and water damage, and virus and fungus growth. The composition may be applied by spraying it onto the materials or by dipping the materials into the composition.

12 Claims, No Drawings

COMBINATION FIRE RETARDANT, ANTI-SOILING AND BIOCIDAL AGENT

BACKGROUND OF THE INVENTION

1. Field of the Invention

The present invention relates to compounds applied to porous materials, such as fabrics, wood, cardboard, and fiberboard, to protect the materials from various destructive and undesirable processes. More particularly, the invention relates to compounds applied to porous materials, especially fabrics of natural and synthetic materials used to make rugs, carpets, furniture coverings, and wall hangings, to protect the fabrics against fire, soil and water damage, and virus and fungus growth. The composition of the present invention, as a result, protects not only the materials to which it is applied but also protects persons in contact with the materials, by stopping fire and germ growth. In addition, the invention relates to the method of mixing the composition and the method of application of the composition to the materials.

2. Description of the Related Art

There are available various chemical compounds that individually provide fire protection, soil and water protection, and protection against virus and fungus growth, for application to porous materials. It is desirable to protect such materials, especially fabrics, from the destructive processes of fire, soil and water damage, and virus and fungus growth. This protection is desirable not only to protect the materials, but to protect persons in the vicinity of the materials. For example, a fabric material treated so as to be highly resistant to fire could materially increase the safety of a person trapped in a fire where the fabric was a potential fuel source. In addition, human health is improved by avoiding contact with virus- and fungus-laden fabrics, especially where such fabrics may be found on articles of furniture.

Existing compositions and methods to provide combined fire, soil and water, and virus and fungus protection pose two problems: high cost and time requirements because multiple applications are needed, and operational and storage problems and loss of protective functions if protectants are mixed. To provide protection against fire, soil and water damage, and germ growth, it has heretofore been necessary to apply different compositions, one by one, generally permitting each application to dry before applying the next. This is highly labor intensive and time consuming and, as a result, expensive. Attempts to mix individual materials providing the various protections have not been successful. Typically, these mixing attempts result in compositions that are of an uneven, coagulated consistency, that clog spray nozzles and cannot be sprayed onto the desired material. Also, in storage after mixing, the compositions settle out and do not remain a homogenous mixture.

Another problem that the prior art reveals is a loss of effectiveness of at least some of the protective agents. Fire retarders are generally fertilizers, and mixing such fertilizers with virus and fungus inhibitors (biocides) has resulted in both a loss of fire retardant properties and biocidal properties, with the two components effectively adversely reacting upon each other. While no representation is made herein as to the exact mechanism by which the present invention preserves the effectiveness of each component, it is believed that the biocide is within micelles in the composition, effectively shielding the biocide from the fertilizer agents and retaining each component's desired function.

The present invention solves the prior art problems related to efficiency of application, storage, and retention of effectiveness. The prior art discloses no single composition which provides, in combination, the desired functions of a fire retardant, soil and water protectant, and biocide. This invention provides a composition and method of making and application thereof, which:

- provides combined protection to porous materials against fire damage, soil and water damage, and virus and fungus growth;
- is mixed and applied as a single, homogeneous composition, suitable for spray or dip application; and
- exhibits stable storage properties and remains a homogeneous mixture over extended periods of time.

It is an object of the present invention to provide a single composition that is a fire retardant, soil and water protectant, and biocide, for application to porous materials, especially fabrics. It is a further object of the invention to provide a process of manufacturing a composition that eliminates previous problems of coagulation, lumping, and settling of the various components in the fluid column. It is a further object of the present invention to provide a single composition and process for making said composition that preserves the desirable functions of each component.

It is yet another object of the present invention to provide a method of protecting materials and persons in the vicinity of the materials from fire, virus, and fungus injury by application of the composition of the present invention.

The objects of the invention are achieved by providing a composition of ammonium phosphate, monobasic; ammonium phosphate, dibasic; a compound comprising ammonium polyphosphate, urea, and water; a fluorinated acrylic polymer; coco imidazuline dicarboxylate; and organotin, in an aqueous base, and further providing particular mixing and application methods.

SUMMARY OF THE INVENTION

The present invention concerns a composition for protecting materials from fire, soil and water damage, viruses, and fungi by application of a single multiple-use composition. The invention comprises a composition of ammonium phosphate (monobasic and dibasic), a compound comprising ammonium polyphosphate, urea, and water, a fluorinated acrylic polymer, coco imidazuline dicarboxylate, and organotin, in an aqueous base. The composition is formed with a proper mixing technique to avoid previous problems of lumping, coagulation, and settling of the composition. The composition is applied to porous materials, especially fabrics made of natural or synthetic materials, to provide multiple protection. In addition, due to the composition's protection against fire, viruses, and fungi, persons in the vicinity of the materials are protected as well.

DESCRIPTION OF THE PREFERRED EMBODIMENT

In the preferred embodiment of the present invention, a composition of six components in a water base is provided.

Ammonium phosphate, monobasic, is a white powder soluble in water, commonly used in fertilizers and fire proofing products. Ammonium phosphate, dibasic, is a white powder soluble in water, also commonly used in fertilizers and fire proofing products. A compound comprising approximately 50% ammonium polyphosphate, 3% urea, and 47% water is commercially available as a product with the brand name Amgard TR. This compound is especially formulated for fire proofing cellulosic materials.

The three phosphate components were selected due to their known fire proofing qualities.

A fluorinated acrylic polymer is commercially available as a product with the brand name Guardex NI-300 as an emulsion formulated to protect fabrics from soil and water damage. This polymeric composition was selected due to its known water and soil protective capabilities.

Coco imidazuline dicarboxylate is commercially available in a product with the brand name Amphoterge K2. This component is a surfactant included to assist in the proper blending of the other components, to enhance the formation of micelles thereby preserving the fire retardant and biocidal aspects of the composition, and to enhance the application of the composition by ensuring proper penetration and covering of the fabric fibers.

Organotin is commercially available in a product with the brand name ViBax 300DC, and is selected for its known biocidal properties.

The phosphates comprising the fire retardant components have natural fertilization characteristics. Due to the composition and method of the present invention, the phosphates can be combined with the organotin, a biocide, without negation of the desirable affects of both components, it is believed, because of the micelle-forming characteristics of the surfactant, thereby isolating the biocide from the fertilizers. The fire retardant and biocidal components retain their respective desirable functions.

The resulting composition of this invention is applied to porous materials by spraying the composition onto the material or by dipping the material into the aqueous solution. The composition should be applied to result in a dry-add on weight of between 6% and 10% for fabrics comprised of natural fibers, and between 8% and 20% for fabrics comprised of synthetic or blends of natural and synthetic fibers. Similar dry add on weights are applicable for other porous materials, such as wood and cardboard. When applied in these percentages, the invention allows the materials to resist flame in order to pass the vertical flame test, National Fire Protection Association Protocol No. 701; makes the materials soil and water resistive; and will not allow the *Staphylococcus aureus,* or related viruses, or the *Aspergillus niger* or related fungi, to form or exist in the material.

The composition of matter in accordance with the present invention comprises between about 2.30% to 9.22% by total weight of ammonium phosphate, monobasic; between about 2.30% to 9.22% by total weight of ammonium phosphate, dibasic; between about 2.30% to 9.22% by total weight of a compound comprising approximately 50% ammonium polyphosphate, 3% urea, and 47% water; between about 2.60% to 10.4% by total weight of an emulsion of fluorinated acrylic polymer; between about 0.025% to 0.1% by total weight of coco imidazuline dicarboxylate; between about 1.00% to 4.00% by total weight of organotin; in between about 57.84% to 89.475% by total weight of water.

The preferred embodiment of the composition comprises 4.61% by total weight of ammonium phosphate, monobasic; 4.61% by total weight of ammonium phosphate, dibasic; 4.61% by total weight of a compound comprising approximately 50% ammonium polyphosphate, 3% urea, and 47% water; 5.2% by total weight of an emulsion of fluorinated acrylic polymer; 0.05% by total weight of coco imidazuline dicarboxylate; 2% by total weight of organotin; and 78.92% by total weight of water.

The process of the present invention comprising the blending of the composition, according to the preferred embodiment, comprises the following steps:

1. placing filtered water representing 78.92% by total weight into a mixing vat having a blade-type mixer therein and maintaining the water at ambient temperature, approximately 70° Fahrenheit to 100° Fahrenheit, in order to promote solution of the remaining components;
2. commencing high speed mixing, with a mixing blade tip velocity of 2500 to 3500 feet/minute, while adding 4.6% by total weight of ammonium phosphate, monobasic, 4.61% by total weight of ammonium phosphate, dibasic, and 4.61% by total weight of a compound comprising approximately 50% ammonium polyphosphate, 3% urea, and 47% water, under continuous mixing conditions;
3. continue high speed mixing until all phosphate components are dissolved, as typically shown by attaining a clear, colorless solution;
6. commencing a slow, low shear agitation with a mixing blade tip velocity between 100 feet/minute and 1000 feet/minute, so as to avoid foaming upon addition of the remaining components;
7. adding, while maintaining slow, low shear agitation, a mixture comprising 0.05% by total weight coco imidazuline dicarboxylate, 5.2% by total weight fluorinated acrylic polymer emulsion, and 2% by total weight organotin; and
8. continuing for a sufficient mixing period the slow, low shear agitation.

The method of application of the composition, according to the preferred embodiment, comprises spraying the composition onto porous materials so as to attain 6 to 10% added dry weight for natural component materials, and 8% to 20% added dry weight for synthetic materials or materials of both natural and synthetic components. The composition can also be applied by dipping the materials into the composition.

It can thus be seen that a novel and efficient multi-purpose agent has been devised for treating porous materials to protect the materials against fire, soil and water damage, and germ growth. It is to be understood that many changes can be made in the present invention by those skilled in the art without departing from the spirit thereof. I therefore pray that my rights to the present invention be limited only by the scope of the appended claims.

I claim:

1. A composition of matter, comprising effective fire retardant, soil and water protectant and biocidal amounts of:

ammonium phosphate, monobasic;

ammonium phosphate, dibasic;

a compound comprising approximately 50% ammonium polyphosphate, 3% urea, and 47% water;

a fluorinated acrylic polymer;

coco imidazuline dicarboxylate; and organotin mixed in an aqueous base.

2. A composition of matter, suitable for use as a combination fire retardant, soil and water protectant, and biocide, comprising:

ammonium phosphate, monobasic, from 2.30% to 9.22% by total weight;

ammonium phosphate, dibasic, from 2.30% to 9.22% by total weight;

a compound comprising approximately 50% ammonium polyphosphate, 3% urea, and 47% water, from 2.30% to 9.22% by total weight;

a fluorinated acrylic polymer, from 2.60% to 10.4% by total weight;

coco imidazuline dicarboxylate, from 0.025% to 0.1% by total weight;

organotin, from 1.00% to 4.00% by total weight; and water, 57.84% to 89.475% by total weight.

3. The composition of claim 2, wherein the active ingredients comprise:

ammonium phosphate, mono basic, 4.61% by total weight;

ammonium phosphate, dibasic, 4.61% by total weight;

a compound comprising 50% ammonium polyphosphate, 3% urea, and 47% water, 4.61% by total weight;

a fluorinated acrylic polymer, 5.2% by total weight;

coco imidazuline dicarboxylate, 0.05% by total weight;

organotin, 2.00% by total weight; and water, 78.92% by total weight.

4. A process of manufacturing a combination fire retardant, soil and water resistive, and biocidal composition, comprising the steps of:

dissolving 2.30% to 9.22% by total weight of ammonium phosphate, monobasic, 2.30% to 9.22% by total weight of ammonium phosphate, dibasic, 2.30% to 9.22% by total weight of a compound comprising 50% ammonium polyphosphate, 3% urea, and 47% water, in water comprising 57.84% to 89.475% by total weight; and adding with continuous agitation a mixture comprising 0.025% to 0.10% by total weight of coco imidazuline dicarboxylate, 2.60% to 10.4% by total weight of fluorinated acrylic polymer emulsion, and 1.00% to 4.00% by total weight of organotin.

5. A process of manufacturing a combination fire retardant, soil and water resistive, and biocidal composition, comprising the steps of:

dissolving 4.61% by total weight of ammonium phosphate, monobasic, 4.61% by total weight of ammonium phosphate, dibasic, 4.61% by total weight of a compound comprising 50% ammonium polyphosphate, 3% urea, and 47% water, in water comprising 78.92% by total weight; and adding with continuous agitation a mixture comprising 0.05% by total weight of coco imidazuline dicarboxylate, 5.2% by total weight of fluorinated acrylic polymer emulsion, and 2.00% by total weight of organotin.

6. A process of manufacturing a fire retardant, soil and water resistive, and biocidal composition, comprising the steps of:

providing water comprising 57.84% to 89.475% by total weight in a container having a blade mixer therein;

commencing mixing wherein a blade tip velocity of said blade mixer is between 2500 and 3500 feet/minute, while adding 2.30% to 9.22% by total weight of ammonium phosphate, monobasic, 2.30% to 9.22% by total weight of ammonium phosphate, dibasic, and 2.30% to 9.22% by total weight of a compound comprising 50% ammonium polyphosphate, 3% urea, and 47% water, continuing said mixing until said active ingredients are dissolved;

commencing mixing wherein said blade tip velocity is between 100 and 1000 feet per minute, while adding a mixture comprising 0.025% to 0.10% by total weight of coco imidazuline dicarboxylate, 2.60% to 10.4% by total weight of fluorinated acrylic polymer emulsion, and 1.00% to 4.00% by total weight of organotin, continuing said mixing for a desired mixing time.

7. A method of protecting porous material from fire damage, soil and water damage, and virus and fungus growth, by applying an effective amount of a composition of matter to said material, said composition of matter comprising:

ammonium phosphate, monobasic, from 2.30% to 9.22% by total weight;

ammonium phosphate, dibasic, from 2.30% to 9.22% by total weight;

a compound comprising approximately 50% ammonium polyphosphate, 3% urea, and 47% water, from 2.30% to 9.22% by total weight;

a fluorinated acrylic polymer, from 2.60% to 10.4% by total weight;

coco imidazuline dicarboxylate, from 0.025% to 0.1% by total weight;

organotin, from 1.00% to 4.00% by total weight; and water, 57.84% to 89.475% by total weight.

8. The method of claim 7, wherein said effective concentration comprises at least 6% by dry add-on weight to said material.

9. The method of claim 7, wherein said effective concentration comprises between 6% and 20% by dry add-on weight to said material.

10. The method of claim 7, wherein said composition comprises:

ammonium phosphate, mono basic, 4.61% by total weight;

ammonium phosphate, dibasic, 4.61% by total weight;

a compound comprising 50% ammonium polyphosphate, 3% urea, and 47% water, 4.61% by total weight;

a fluorinated acrylic polymer, 5.2% by total weight;

coco imidazuline dicarboxylate, 0.05% by total weight;

organotin, 2.00% by total weight; and water, 78.92% by total weight.

11. The method of claim 7, wherein said application is by spraying said composition onto said material.

12. The method of claim 7, wherein said application is by dipping said material into said composition.

* * * * *